(12) United States Patent
Osenkov (10) Patent No.: US 8,962,957 B2
(45) Date of Patent: Feb. 24, 2015

(54) GUITAR TRAINING AID

(71) Applicant: Oleg Osenkov, Scarsdale, NY (US)

(72) Inventor: Oleg Osenkov, Scarsdale, NY (US)

(*) Notice: Subject to any disclaimer, the term of this patent is extended or adjusted under 35 U.S.C. 154(b) by 42 days.

(21) Appl. No.: 13/886,388

(22) Filed: May 3, 2013

(65) Prior Publication Data

US 2014/0326124 A1    Nov. 6, 2014

(51) Int. Cl.
*G10D 3/00* (2006.01)
*G10D 3/06* (2006.01)

(52) U.S. Cl.
CPC .................................... *G10D 3/06* (2013.01)
USPC .................................... 84/293; 84/470 R (58) Field of Classification Search
USPC ............... 84/293, 470 R, 477 R, 484, 485 R, 84/485 SR
See application file for complete search history.

(56) References Cited

U.S. PATENT DOCUMENTS 5,540,133 A * 7/1996 Draper et al. ............... 84/471 R \* cited by examiner

*Primary Examiner* — Kimberly Lockett
(74) *Attorney, Agent, or Firm* — John Murray; Andrews Kurth LLP (57) ABSTRACT

A training aid for playing a stringed instrument of the type having a neck and a fingerboard for assisting an instrument player in the proper placement of the thumb on the back of the instrument neck while playing the instrument, said training aid comprising: (a) a solid piece positioned on the back of the neck of the instrument against which said instrument player's thumb will be positioned; (b) an attachment to the solid piece, wherein said attachment enables said solid piece to be added to the back of the instrument's neck or removed from the back of the instrument's neck. The instrument may be a guitar.

14 Claims, 6 Drawing Sheets

GUITAR TRAINING AID

FIELD OF INVENTION

This invention relates to a left hand thumb guide for guitars and relates more particularly to a novel stop means carried on a guitar neck at a selected point near the headstock to post the left hand thumb correctly when playing the guitar.

BACKGROUND OF THE INVENTION

Many guitar students just let the left hand thumb fall anywhere where it feels comfortable. The result? An inability to play even simple chords and fingers not being able to reach fret locations. So guitar students should keep the thumb slightly closer to the hand from where the exact center of the back of the neck is located and also positioned directly in between the second and third fingers. This will balance the left hand and also allow it to be ready for any fingering patterns. The left hand is required to run a lot of tasks while playing the guitar, and classical repertoire in particular makes hefty demands. For this reason it is important to set up your left hand correctly right from the beginning of your development. If you establish a solid foundation then you will put yourself in the best position to improve and develop quickly. So, in order to have the fingers hop around freely on the fingerboard the thumb should remain around the center of the neck.

U.S. Pat. No. 3,854,370 discloses a fingerboard having a light transmitting substrate spaced from the neck of a guitar or a similar musical instrument. A plate, which has a finger placement pattern on it, is received in the space between the neck and the fingerboard. The plate is opaque and the finger placement pattern has light transmitting areas. Light is transmitted from a source within the neck through the light transmitting areas to the fingerboard, thus guiding finger placement.

U.S. Pat. No. 4,505,178 discloses a training device for building hard callus pads on the ends of the fingers used in chording the guitar and to strengthen the muscles used to press strings against frets. The device is provided with raised edges simulating the cross-section and texture of actual guitar strings. The raised edges are mounted on a spring loaded button to simulate the give and tension felt in making chords. The entire device is easily held and fits in any pocket or purse.

U.S. Pat. No. 7,064,260 discloses a small, portable device with a rigid, short neck body, u-shaped in cross-section and designed to simulate a short section of the neck of a stringed instrument, such as a guitar. The neck body is hollow with an elongated main cavity with two or more, transversely aligned finger bars which mimic guitar frets. Each finger bar is mounted on two or more coil springs enabling it to move up and down on the neck body. The top of each finger bar is flat and includes four to six raised string lines that represent strings on a stringed instrument. The main cavity is divided into a plurality of finger bar cavities by a plurality of support ribs. When at rest, the top surfaces of the finger bars are elevated above the support ribs and represent frets on the neck body.

U.S. Pat. No. 7,304,224 discloses a practice and exercise device with a fingerboard on the front of a housing, a plurality of strings, and a circuit to generate an A, D, or E tone. The circuit includes touch sensitive switches, which are in operable communication with the fingerboard. The fingerboard includes at least one fret fixed transversely across the fingerboard and visually distinguishable markings. The markings are located at positions on the fingerboard corresponding to tones A, D, and E, and the touch sensitive switches are located beneath the markings. When the trainee touches the markings the appropriate tone is emitted.

US2010/0192751 discloses a hand position training aid for a guitar, comprising a spacer bar adapted to be attached along an edge of a neck of a guitar, parallel to the strings of the guitar. Clips connected to the spacer bar operate to engage the neck of the guitar to retain the spacer bar in position on the neck of the guitar.

None of the prior art addresses the fundamental problem of positioning of the thumb on the back of the guitar neck and the need to develop sufficient strength in wrist muscles to maintain the correct position. The invention described herein discloses a guitar training aid that will assist learners in developing good fundamentals in positioning their thumb on the back of the guitar neck and also building sufficient wrist strength to hold this position while playing for extended periods of time.

SUMMARY OF THE INVENTION

It is the primary object of the invention to provide a training aid for playing a stringed instrument of the type having a neck and a fingerboard for assisting an instrument player in the proper placement of the thumb on the back of the instrument neck while playing the instrument, said training aid comprising: (a) a solid piece positioned on the back of the neck of the instrument against which said instrument player's thumb will be positioned; (b) an attachment to the solid piece, wherein said attachment enables said solid piece to be added to the back of the instrument's neck or removed from the back of the instrument's neck. The solid piece may be a thumb hook. The attachment may be a solid base integrated with the solid piece, and wherein an adhesive is used to fix the solid piece in position on the back of the instrument's neck. The attachment may be a screw. The attachment may be a plurality of screws. The attachment may be made from tape. The attachment may be a metal clip. The attachment may be a side hook. The solid base may be a thumb space, whereby the instrument player's thumb may touch the back of the instrument's neck. The instrument may be a guitar.

Another preferred embodiment of the invention is a training aid for playing a stringed instrument of the type having a neck and a fingerboard for assisting an instrument player in the proper placement of the thumb on the back of the instrument neck while playing the instrument, said training aid comprising: (a) a solid piece positioned on the back of the neck of the instrument against which said instrument player's thumb will be positioned; (b) hinges that attach the solid piece in position on the back of the instrument's neck, whereby the solid piece may be raised and lowered. The solid piece may be a thumb stopper. The instrument may be a guitar.

The present invention also encompasses a method of training a player of a stringed instrument of the type having a neck and a fingerboard by assisting an instrument player in the proper placement of the thumb on the back of the instrument neck while playing the instrument, said method comprising: (a) positioning a solid piece on the back of the neck of the instrument against which said instrument player's thumb will be positioned; (b) directing the player of the instrument to place their thumb against the solid piece, whereby the solid piece holds the players thumb in the correct position while the instrument is played. The instrument may be a guitar.

Further aspects and advantages of the invention will appear from the following description taken together with the accompanying drawings.

BRIEF DESCRIPTION OF THE DRAWINGS

The above and other objects and advantages of the invention will be apparent upon consideration of the following detailed description, taken in conjunction with the accompanying figure, in which like reference characters refer to like parts throughout, and in which.

DETAILED DESCRIPTION OF THE EXEMPLARY EMBODIMENTS

One mode for carrying out the invention is presented in terms of its preferred embodiment, herein depicted within FIG. 1. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only certain particular configurations are shown and described for purposes of clarity and disclosure and not by way of limitation of scope. The definitions provided herein provide descriptive guidance to one of ordinary skill, but do not place limitations upon the reasonable scope of the meaning of claim terms.

Headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The terms "a" and "an" herein do not denote a limitation of quantity, but rather denote the presence of at least one of the referenced items.

Figure 1A:
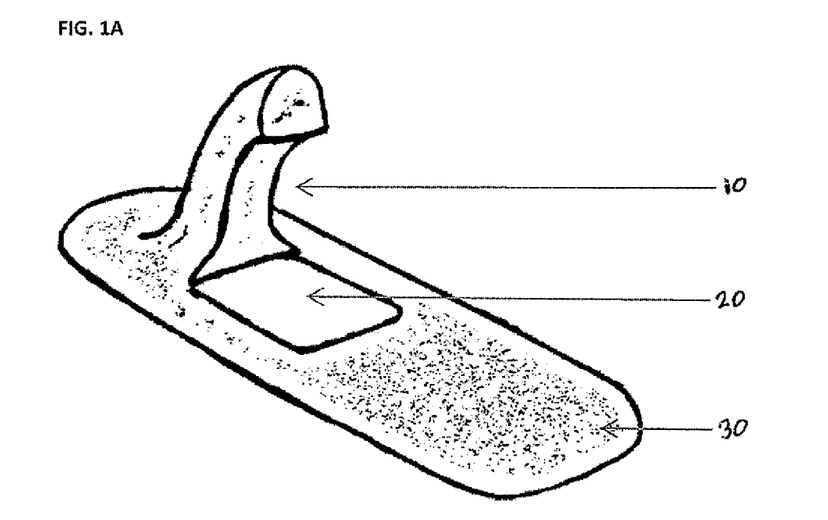
FIG. 1A is a view of the guitar training aid, according to one preferred embodiment of the present invention.

Referring now to FIG. 1A, this figure shows a preferred embodiment of the present invention, a guitar training aid with a thumb hook (10), a thumb space (20) located beneath the thumb hook, and a rigid base (30) with a flat underside from which the thumb hook rises and in which the thumb space is located. The guitar training aid as shown is one single solid piece, which may be made out of plastic or any other durable materials, such as metal, wood, etc. The thumb hook is designed so as to provide purchase for the thumb of a guitar player when the thumb is placed over the thumb space. If need be the underside of the rigid base may be curved slightly to better fit certain types of guitar neck.

Figure 1B:
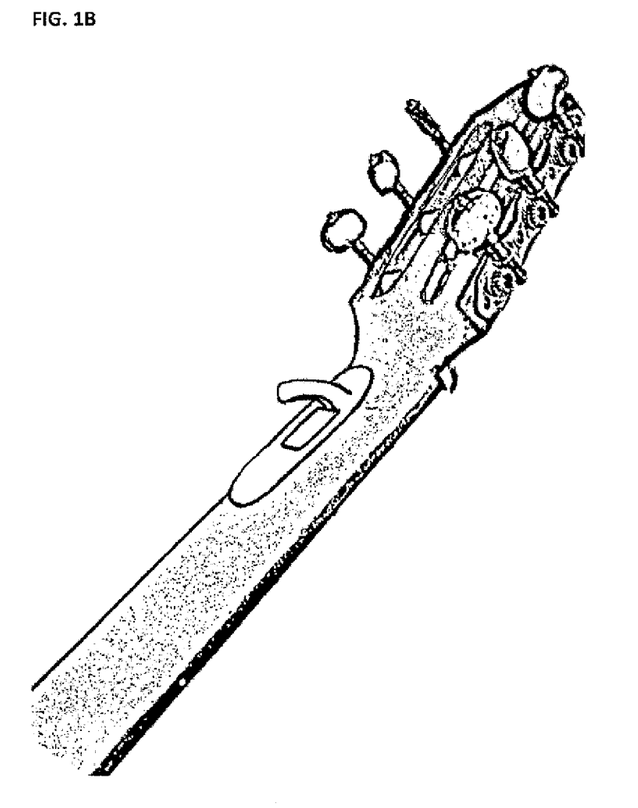
FIG. 1B is a view of the guitar training aid in place on a guitar neck, according to one preferred embodiment of the present invention.

FIG. 1B shows this preferred embodiment in situ on the back of a guitar neck. The guitar training aid may be fixed to the back of the guitar neck with any well-known form of adhesive, such as glue, sticky tape, etc, known to one of ordinary skill in the art. The guitar training aid might also be screwed on to the back of the neck in any manner that would be known to one of ordinary skill in the art. The guitar training aid is positioned so that the guitar player will be able to insert his or her thumb into position over the thumb space, which allows the pad of the thumb to rest against the wood of the guitar neck in the appropriate position, and the thumb hook will then keep the guitar player's thumb in place as the guitar is played.

Figure 2A:
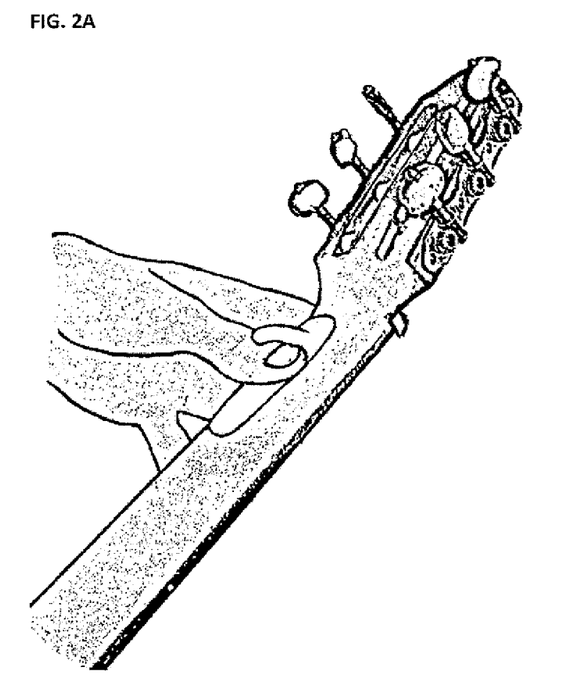
FIG. 2A is a view of the guitar training aid in use by a guitar player, showing the positioning of the thumb, according to one preferred embodiment of the present invention.

Referring now to FIG. 2A, this figure shows the preferred embodiment in use by a guitar player from an angle that highlights the way in which the thumb of the guitar player is held in place by the curve of the guitar hook. The degree, or angle of, or size of the curvature of the thumb hook is not limiting on the invention. One of ordinary skill in the art will understand that minor variations in the curvature of the thumb hook may be made without interfering with the ability of the thumb hook to hold the inserted thumb in position. One of ordinary skill in the art will also understand that the hook itself may be replaced with alternatives such as a thumb ring.

Figure 2B:
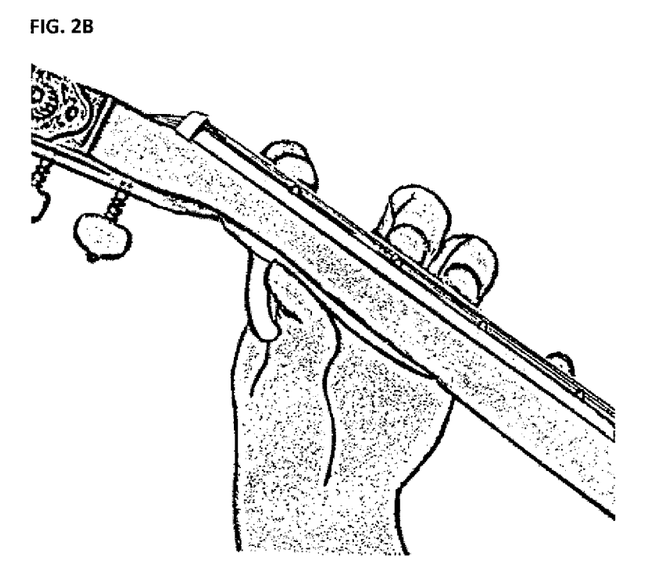
FIG. 2B is a side-view of the guitar training aid in use by a guitar player, showing the positioning of the thumb, according to one preferred embodiment of the present invention.

FIG. 2B shows a side-view of the preferred embodiment of the guitar training aid in use by a guitar player. It can be seen that the hook keeps the guitar player's thumb in place while the guitar player's fingers play on the guitar's finger board. This ensures that the hand, and in particular the wrist, of the guitar player is trained to play in a fundamentally sound position which allows the guitar player's fingers to play with greater freedom because the guitar player's thumb is gripping the back of the guitar neck in a technically optimal position. With time and practice, a learner will be able to play the guitar without the training aid while maintaining the technically optimal position.

Figure 3A:
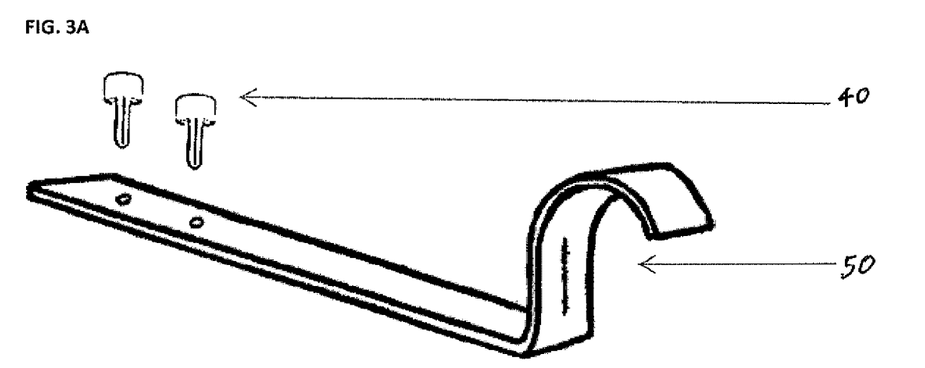
FIG. 3A is a view of an alternative embodiment of the guitar training aid, showing an alternative design and means of attaching the guitar training aid against the guitar neck using screws, according to one preferred embodiment of the present invention.

Referring now to FIG. 3A, this figure shows an alternative embodiment of the invention, in which the guitar training aid will be fixed to the guitar neck using screws (40) which will fasten a single rigid piece ending in a thumb hook (50). The single solid piece may be made of metal, wood, or plastic or any other durable material such as would be known to one of ordinary skill in the art.

Figure 3B:
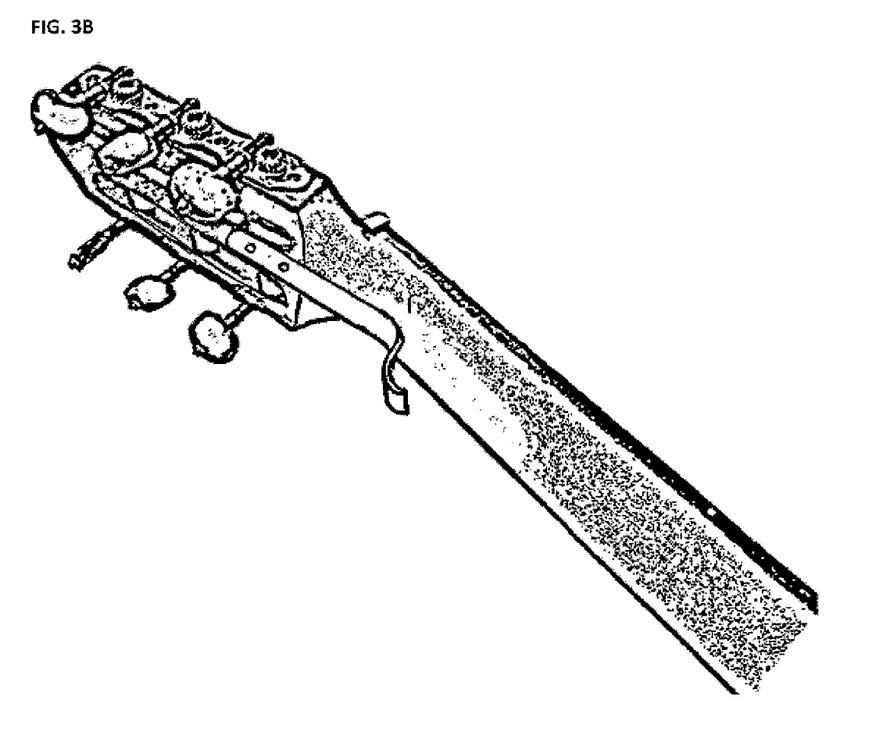
FIG. 3B shows the guitar training aid in place on the guitar neck, held in place by the alternative means of attachment.

FIG. 3B shows this alternative embodiment in situ on the back of a guitar neck. The guitar training aid is screwed in place on the middle rung of the guitar head stock, as shown, so that the single solid piece ending in a thumb hook will extend downwards from the guitar head and make contact with the back of the guitar neck in a suitable position for use by a guitar player. This alternative embodiment may then be used by a guitar player in the same manner as shown in FIGS. 2A and 2B, with the guitar player's thumb held in place by the thumb hook while the guitar player's fingers play on the guitar's finger board. One of ordinary skill will understand that the different fain' of attachment does not affect the successful operation of the guitar training aid and the particular form of attachment used is not limiting on the invention.

Figure 4A:
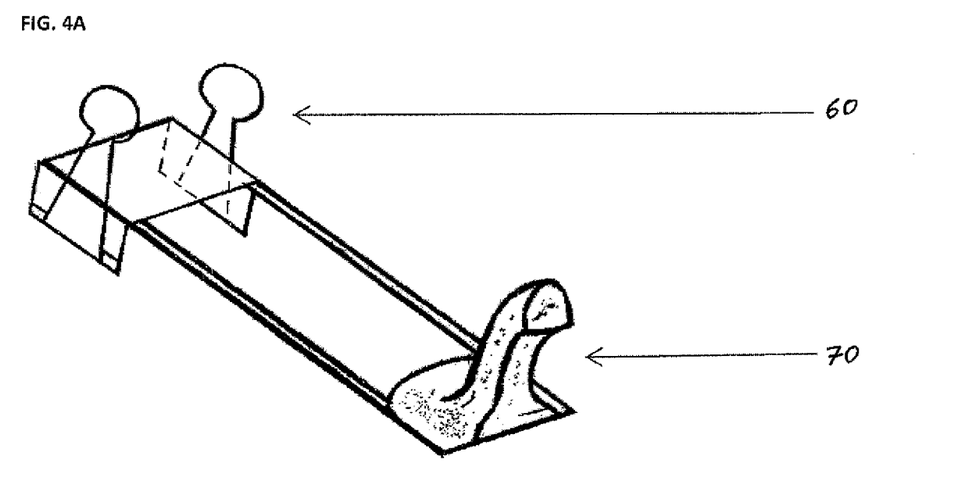
FIG. 4A is a view of an alternative embodiment of the guitar training aid, showing an alternative design and means of attaching the guitar training aid against the guitar neck using a metal clip, according to one preferred embodiment of the present invention.

Referring now to FIG. 4A, this figure shows an alternative embodiment of the invention, in which the guitar training aid will be fixed to the guitar neck by means of a metal clip (60) while the thumb hook (70) is connected to the metal clip by rigid wires as shown. One of ordinary skill in the art will understand that the materials used for the thumb hook, clip and rigid wires are not limiting. This form of attachment for the guitar training aid offers greater flexibility of positioning than the use of screws or glue to fix the guitar training aid in place.

Figure 4B:
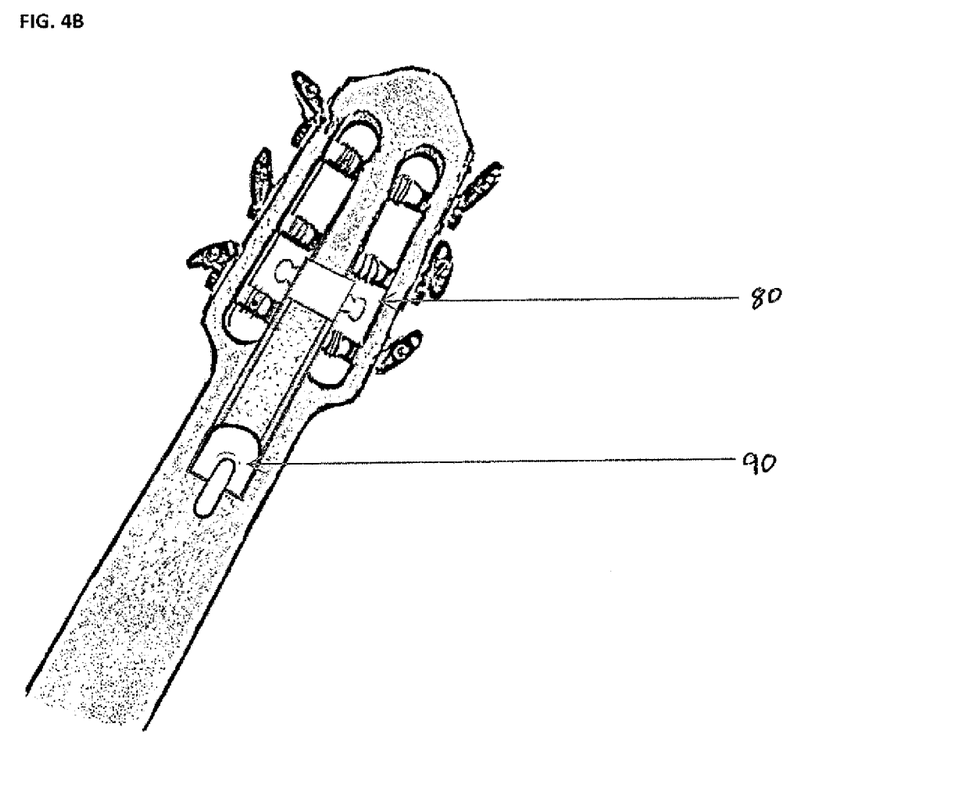
FIG. 4B shows the guitar training aid in place on the guitar neck, held in place by the alternative means of attachment.

FIG. 4B shows this alternative embodiment in situ on the back of a guitar neck. As can be seen, the clip is positioned so as to fasten on the middle rung of the guitar head stock, while the rigid wires extend downwards so that the thumb hook is correctly positioned on the back of the guitar neck. This alternative embodiment may then be used by a guitar player in the same manner as shown in FIGS. 2A and 2B, with the guitar player's thumb held in place by the thumb hook while the guitar player's fingers play on the guitar's finger board. One of ordinary skill will understand that the different form of attachment does not affect the successful operation of the guitar training aid and the particular form of attachment used is not limiting on the invention.

Figure 5A:
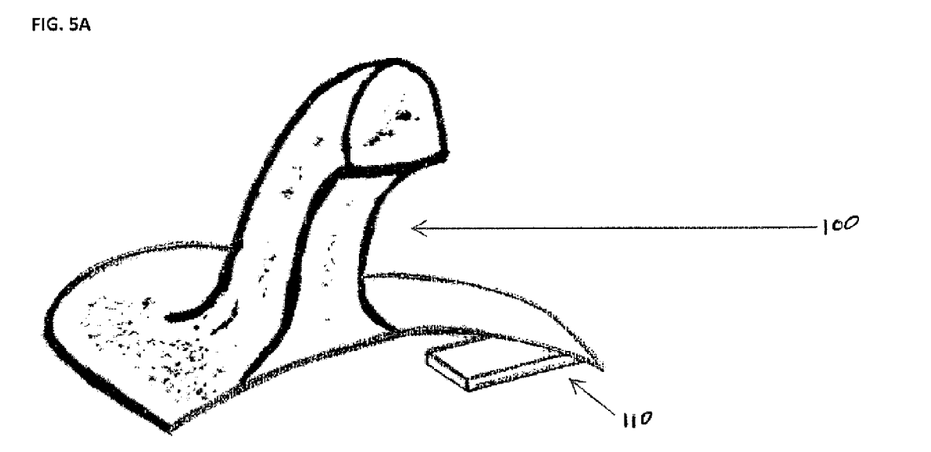
FIG. 5A is a view of an alternative embodiment of the guitar training aid, showing an alternative design and means of attaching the guitar training aid against the guitar neck using a side-hook, according to one preferred embodiment of the present invention.

Referring now to FIG. 5A, this figure shows an alternative embodiment of the invention, in which the guitar training aid will be fixed to the guitar neck by means of a side hook (110) while the thumb hook (100) is part of the same solid piece. One of ordinary skill in the art will understand that the materials used for the thumb hook and side hook are not limiting. This means of attachment for the guitar training aid offers greater flexibility of positioning than the use of screws or glue to fix the guitar training aid in place.

Figure 5B:
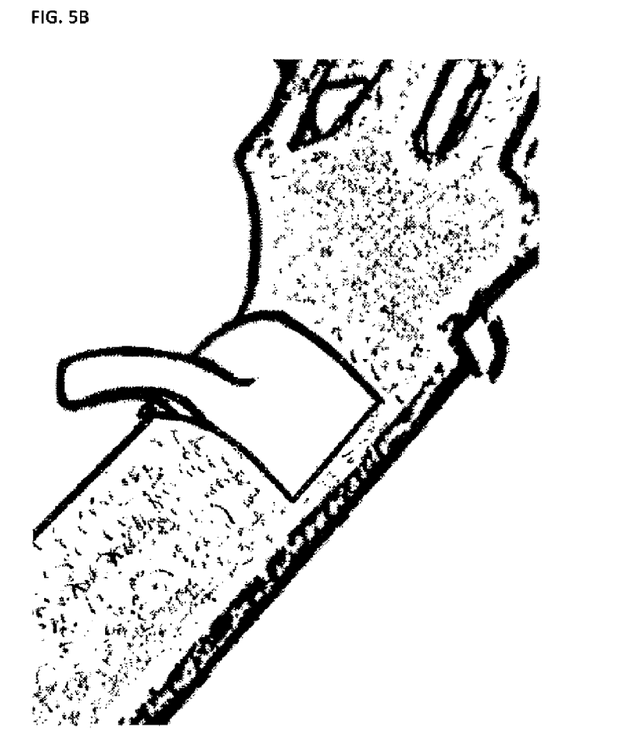
FIG. 5B shows the guitar training aid in place on the guitar neck, held in place by the alternative means of attachment.

FIG. 5B shows this alternative embodiment in situ on the back of a guitar neck. As can be seen, the guitar training aid is positioned so as to be correctly positioned on the back of the guitar neck by the side clip. The side clip attaches on the straight edge of the guitar's finger board. One of ordinary skill in the art will understand that in this alternative embodiment, the guitar training aid may be curved to conform to the typical shape of the back of a guitar neck, and that minor variations in the curvature of the guitar training aid are not limiting on the invention. This alternative embodiment may then be used by a guitar player in the same manner as shown in FIGS. 2A and 2B, with the guitar player's thumb held in place by the thumb hook while the guitar player's fingers play on the guitar's finger board. One of ordinary skill will understand that the different form of attachment does not affect the successful operation of the guitar training aid and the particular form of attachment used is not limiting on the invention.

Figure 6A:
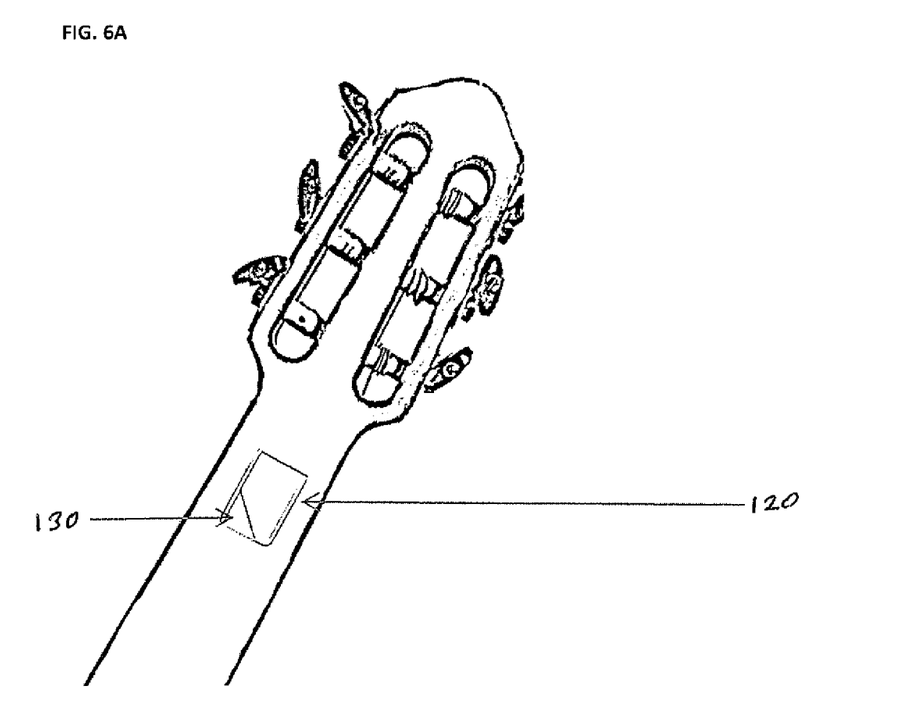
FIG. 6A is a view of an alternative embodiment of the guitar training aid, showing a thumb stop built into the neck of the guitar itself, according to one preferred embodiment of the present invention.

Referring now to FIG. 6A, this figure shows an alternative embodiment of the invention, in which the guitar training aid is built into the guitar neck by means of a thumb stopper (120) which is designed like a hinged lid (130) which may be raised up on the back of the guitar neck whenever desired by a guitar player. One of ordinary skill in the art will understand that the materials used for the thumb stopper or hinges for the lid are not limiting. One of ordinary skill in the art will understand that the design of the hinges is not limiting. This embodiment of the guitar training aid offers the convenience to the guitar player of not having to fix the guitar training aid in place or having to carry one around.

Figure 6B:
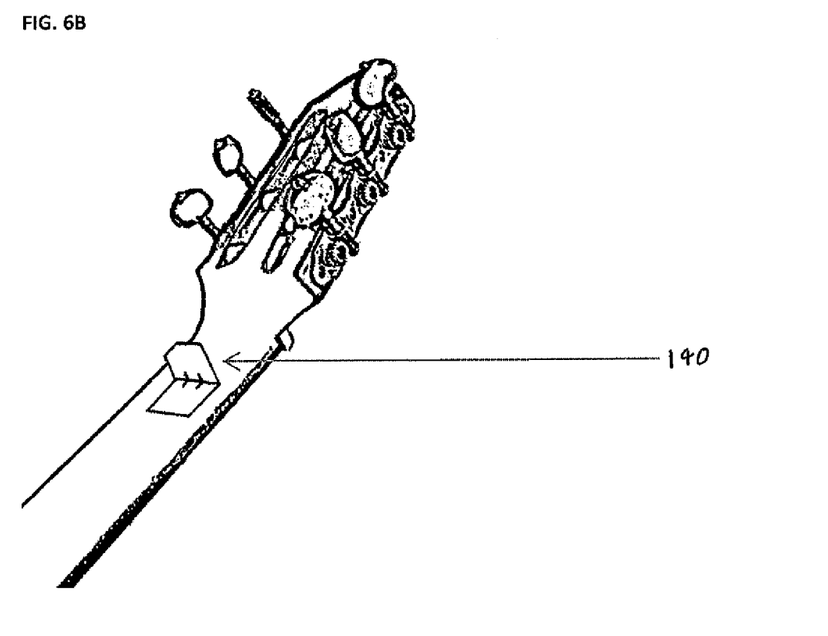
FIG. 6B shows the guitar training aid in place on the guitar neck with the thumb stop raised, according to an alternative embodiment of the invention.

FIG. 6B shows this alternative embodiment in situ on the back of a guitar neck. As can be seen, the thumb stopper is positioned so that it can be raised on the back of the guitar neck (140). This alternative embodiment may then be used by a guitar player in the same manner as shown in FIGS. 2A and 2B, with the guitar player's thumb held in position by the thumb stopper while the guitar player's fingers play on the guitar's finger board. One of ordinary skill will understand that the different form of attachment does not affect the successful operation of the guitar training aid and the particular form of attachment used is not limiting on the invention.

The guitar training aid is preferably manufactured in a material, such as plastic, that is rigid enough to hold it in place, and malleable enough to ensure that the training aid does not damage the instrument.

The training aid can be used on left or right handed instruments and could be used on any string instruments that are designed with a neck and fingerboard, such as banjos, mandolins, violins, viola and cellos.

It is understood that the term "stringed instrument" as used herein refers to any musical instrument in which sound is produced by the vibration of a string across a soundboard or soundbox; or an instrument, such as a guitar, banjo, violin, viola, cello, or double bass, in which sound is produced by plucking, striking, or bowing taut strings.

It is understood that the term "fingerboard" as used herein refers to the part of a stringed instrument against which the fingers press the strings to vary the tone; or a flat or roughly flat strip on the neck of a stringed instrument, against which the strings are pressed to shorten the vibrating length.

It is understood that the term "neck" as used herein refers to the part of certain string instruments that projects from the main body and is the base of the fingerboard, where the fingers are placed to stop the strings at different pitches. Guitars, banjos, ukeleles, lutes, the violin family, and the mandolin family are examples of instruments which have necks. The "neck" is also understood to be the part of a stringed musical instrument extending from the body and supporting the fingerboard and strings.

It is understood that the term "attachment" as used herein refers to the particular form by which a solid piece may be fixed in position to the back of a stringed instrument's neck, such as tape, a solid base with adhesive on the bottom side, a side hook, screws, a clip, etc. The attachment may be integrated with the solid piece, as for example a solid base, or it may be detachable from the solid piece, as for example tape or screws. It is understood that the term "solid piece" refers to a solid form which can act as a novel stop for a thumb placed on an instrument neck at a selected point.

It is understood that the term "thumb hook" as used herein refers to a solid piece of a material such as plastic, wood, or metal, or any of their equivalent materials, which is curved or bent back at an angle, for catching hold of a thumb so that the thumb maintains its position with the aid of the hook.

It is understood that the term "thumb stopper" as used herein refers to a solid piece of a material such as plastic, wood, or metal, or any of their equivalent materials, which is designed to stop a thumb held against the stopper from sliding or slipping out of position.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. It is understood that various omissions or substitutions of equivalents are contemplated as circumstance may suggest or render expedient, but is intended to cover the application or implementation without departing from the spirit or scope of the claims of the present invention.

What is claimed is:

1. A training aid for playing a stringed instrument of the type having a neck and a fingerboard for assisting an instrument player in the proper placement of a thumb on the back of the instrument neck while playing the instrument, said training aid comprising:
    (a) a solid piece positioned on the back of the neck of the instrument against which said instrument player's thumb will be positioned, wherein said solid piece is a thumb hook;
    (b) an attachment to the solid piece, wherein said attachment enables said solid piece to be added to the back of the instrument's neck or removed from the back of the instrument's neck.

2. The training aid of claim 1, wherein said attachment is a solid base integrated with said solid piece, and wherein an adhesive is used to fix said solid piece in position on the back of the instrument's neck.

3. The training aid of claim 1, wherein said attachment is a screw.

4. The training aid of claim 1, wherein said attachment is a plurality of screws.

5. The training aid of claim 1, wherein said attachment is made from tape.

6. The training aid of claim 1, wherein said attachment is a metal clip.

7. The training aid of claim 1, wherein said attachment is a side hook.

8. The training aid of claim 2, wherein said solid base includes a thumb space, whereby the instrument player's thumb may touch the back of the instrument's neck.

9. The training aid of claim 1, wherein said instrument is a guitar.

10. A training aid for playing a stringed instrument of the type having a neck and a fingerboard for assisting an instrument player in the proper placement of a thumb on the back of the instrument neck while playing the instrument, said training aid comprising:
    (a) a solid piece positioned on the back of the neck of the instrument against which said instrument player's thumb will be positioned;
    (b) a set of hinges that attach the solid piece in position on the back of the instrument's neck, whereby the solid piece may be raised and lowered.

11. The training aid of claim 10, wherein said solid piece is a thumb stopper.

12. The training aid of claim 10, wherein said instrument is a guitar.

13. A method of training a player of a stringed instrument of the type having a neck and a fingerboard by assisting an instrument player in the proper placement of a thumb on the back of the instrument neck while playing the instrument, said method comprising:
    (a) positioning a solid piece on the back of the neck of the instrument;
    (b) directing the player of the instrument to place their thumb against the solid piece, whereby the solid piece holds the player's thumb in the correct position while the instrument is played.

14. The method of claim 13, wherein said instrument is a guitar.

* * * * *